(12) United States Patent
Sato et al.

(10) Patent No.: US 6,861,453 B2
(45) Date of Patent: Mar. 1, 2005

(54) PROCESS FOR PRODUCING A URETHANE-MODIFIED POLYISOCYANURATE FOAM

(75) Inventors: Tsuyoshi Sato, Kanagawa (JP); Tsutomu Nakamura, Kanagawa (JP)

(73) Assignee: Hodogaya Chemical Co., Ltd., Kawasaki (JP)

(*) Notice: Subject to any disclaimer, the term of this patent is extended or adjusted under 35 U.S.C. 154(b) by 85 days.

(21) Appl. No.: 10/276,694

(22) PCT Filed: Mar. 14, 2002

(86) PCT No.: PCT/JP02/02430

§ 371 (c)(1),
(2), (4) Date: Apr. 24, 2003

(87) PCT Pub. No.: WO02/077053

PCT Pub. Date: Oct. 3, 2002

(65) Prior Publication Data

US 2003/0187085 A1 Oct. 2, 2003

(30) Foreign Application Priority Data

Mar. 16, 2001 (JP) .......................... 2001-75232

(51) Int. Cl.$^7$ .............................................. C08G 18/28
(52) U.S. Cl. ..................... 521/170; 521/112; 521/128; 521/129; 521/130; 521/163; 521/166; 521/177
(58) Field of Search ............................... 521/112, 128, 521/129, 130, 163, 166, 170, 177

(56) References Cited

U.S. PATENT DOCUMENTS

| | | | |
|---|---|---|---|
| 4,425,446 A | | 1/1984 | Malwitz et al. |
| 4,473,669 A | * | 9/1984 | Rupert et al. ............... 521/177 |
| 5,064,872 A | * | 11/1991 | Monstrey et al. ........... 521/131 |
| 5,169,875 A | | 12/1992 | Nakamura et al. |
| 5,645,928 A | * | 7/1997 | Matsumoto et al. ..... 428/304.4 |
| 5,958,990 A | | 9/1999 | Grimminger |
| 6,541,530 B2 | | 4/2003 | Sato et al. |

FOREIGN PATENT DOCUMENTS

| | | |
|---|---|---|
| JP | 50-109295 | 8/1975 |
| JP | 4-246430 | 9/1992 |
| JP | 5-202159 | 8/1993 |
| JP | 7-30155 | 4/1995 |
| JP | 8-134169 | 5/1996 |
| JP | 2972523 | 8/1999 |
| JP | 11-286530 | 10/1999 |
| JP | 2002-12644 | 1/2002 |

* cited by examiner

*Primary Examiner*—John M. Cooney, Jr.
(74) *Attorney, Agent, or Firm*—Oblon, Spivak, McClelland, Maier & Neustadt, P.C.

(57) ABSTRACT

A process for producing a urethane-modified polyisocyanurate foam having excellent characteristics such as flame retardancy, heat resistance and low smoking property, and further having improved initial adhesion, particularly adhesion after a relatively long period of time, to a facing material particularly a flexible facing material, by using water as a blowing agent, is provided. A polyisocyanate compound component, a polyol component, water and a morpholine compound are reacted in the presence of a trimerization catalyst for isocyanates.

9 Claims, 1 Drawing Sheet

US 6,861,453 B2

PROCESS FOR PRODUCING A URETHANE-MODIFIED POLYISOCYANURATE FOAM

TECHNICAL FIELD

The present invention relates to a process for producing a foam having excellent characteristics such as flame retardancy, heat resistance and low smoking property, and having improved initial adhesion to a facing material, without using specific flon ("chlorofluorocarbon", hereinafter referred to simply as "CFC") or a flon substitute ("hydrochlorofluorocarbon", hereinafter referred to simply as "HCFC").

BACKGROUND ART

Heretofore, urethane-modified polyisocyanurate foams have been known as heat insulating materials excellent in flame retardancy, heat resistance and low smoking property. In this case, it has been essential to replace CFCs and HCFCs used as a blowing agent because of a problem of depleting the ozone layer, and a production process using water as a blowing agent substitute (i.e. carbon dioxide gas generated when water and a polyisocyanate are reacted acts as a blowing agent) has been studied. In a case where water is used as a blowing agent, in a case of continuous production of e.g. laminate boards or metal sidings, the initial adhesion to a facing material tends to decrease, and thus various improvements have been attempted, but no satisfactory result has been obtained.

Further, with respect to the initial adhesion in production process, there are problems in adhesion at the time of cutting in an extremely short period of time (within 5 minutes after initiation of foaming) and adhesion at the time of cutting and handling of a product in the process (after a relatively long period of time, i.e. within about 30 minutes after initiation of foaming), and particularly a decrease in adhesion after a relatively long period of time has been problematic. For example, Japanese Patent No. 2972523 discloses improvement in initial adhesion by use of a fatty acid phosphate containing no halogen, however, adhesion after a relatively long period of time significantly decreases, such being problematic. Japanese Patent Application 2000-199501 discloses improvement in initial adhesion by use of a compatibilizing agent, however, adhesion after a relatively long period of time significantly decreases similarly in most cases, such being problematic.

A schematic drawing illustrating a change with time of adhesion to a facing material, particularly a flexible facing material, in a case of production of e.g. a laminate board or a metal siding using a urethane-modified polyisocyanurate foam as a core, is shown in FIG. 1. From 1 to 2 minutes after removal from a mold, the adhesion is at least 1 kg/10 cm width (peeling test, the same applies hereinafter), however, after from 30 to 60 minutes, the adhesion reaches the minimum. As time further passes, the final adhesion recovers to at least 1 kg/10 cm width, however, the time when the adhesion reaches the minimum overlaps with a time when a product is handled in many cases, and peeling of a facing material tends to take place, thus leading to difficulty in production. The above tendency is particularly remarkable when the density of the foam is decreased. It is an object of the present invention to provide a urethane-modified polyisocyanurate foam having excellent characteristics such as flame retardancy, heat resistance and low smoking property, and further having improved initial adhesion, particularly adhesion after a relatively long period of time, to a facing material particularly a flexible facing material, which employs water as a blowing agent and which employs no CFCs or HCFCs.

DISCLOSURE OF THE INVENTION

The present inventors have conducted extensive studies on improvement in initial adhesion, particularly adhesion after a relatively long period of time, to a facing material particularly a flexible facing material, while maintaining excellent characteristics such as flame retardancy, heat resistance and low smoking property, by using water as a blowing agent for production of a urethane-modified polyisocyanurate foam, and as a result, they have found that a morpholine compound improves initial adhesion, particularly adhesion after a relatively long period of time, to a flexible facing material, and the present invention has been accomplished on the basis of this discovery.

Namely, the present invention provides a process for producing a urethane-modified polyisocyanurate foam, which comprises reacting a polyisocyanate compound component (A), a polyol component (B), water (C), a foam stabilizer (D) and a morpholine compound (E), in the presence of a trimerization catalyst (F). Further, the present invention is characterized in that the morpholine compound (E) is used in an amount of from 1 to 20 parts by weight based on 100 parts by weight of the polyol component (B), the foam stabilizer (D) is used in an amount of from 0.5 to 5 parts by weight based on 100 parts by weight of the polyol component (B), the trimerization catalyst (F) is used in an amount of from 0.35 to 15 parts by weight based on 100 parts by weight of the polyol component (B), and water (C) is used in an amount of from 2 to 30 parts by weight based on 100 parts by weight of the polyol component (B).

Further, the present invention is characterized in that the morpholine compound (E) is one or two or more members selected from morpholine, N-methylmorpholine and N-ethylmorpholine, the polyol component (B) contains a benzylic ether type phenolic resin and/or a modified phenolic resin obtained by reacting a polyhydric alcohol or its alkylene oxide adduct with a benzylic ether type phenolic resin, the foam stabilizer (D) is an organic polysiloxane copolymer, the trimerization catalyst (F) is a trimerization catalyst for isocyanates, comprising an organic metal salt or a tertiary amine salt, and the trimerization catalyst (F) is used together with a urethane-forming catalyst.

The process for producing a urethane-modified polyisocyanurate foam of the present invention employs a morpholine compound which is a nitrogen-containing type and a cyclic ether type, and accordingly even when water is used as a blowing agent, the produced foam has excellent characteristics such as flame retardancy, heat resistance and low smoking property, and in addition, has improved initial adhesion, particularly adhesion after a relatively long period of time, to a facing material particularly a flexible facing material.

BEST MODE FOR CARRYING OUT THE INVENTION

Figure 1:
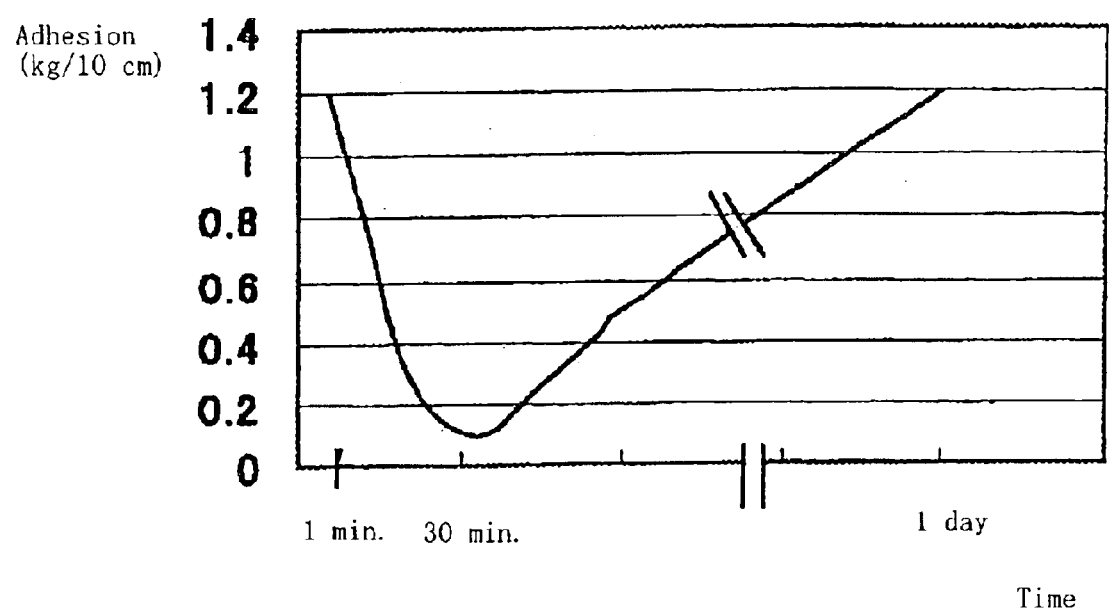
FIG. 1: A diagram illustrating a change with time of adhesion to a facing material particularly a flexible facing material in a case of production of e.g. a laminate board or a metal siding using a urethane-modified polyisocyanurate foam as a core.

The polyol component used in the present invention is a mixture of polyols generally used for production of a urethane foam. Examples of the polyols include ethylene glycol, diethylene glycol, polyethylene glycol, propylene glycol, dipropylene glycol, polypropylene glycol, polytetramethylene glycol, 1,4-butanediol or these difunctional polyols addition-polymerized with one or two or more kinds of alkylene oxides, trifunctional polyols such as trimethylolpropane, glycerin or these trifunctional polyols addition-polymerized with one or two or more kinds of alkylene oxides, polyfunctional polyols such as pentaerythritol, sorbitol, sugar or these polyfunctional polyols addition-polymerized with one or two or more kinds of alkylene oxides, alkanolamine addition-polymerized with one or two or more kinds of alkylene oxides, an aromatic polyester polyol and an acryl polyol resin.

Further, as the polyols, a phenolic resin, a modified phenolic resin, benzylic ether type phenolic resin, and a modified phenolic resin produced by a method as disclosed in JP-B-7-30156 (from 20 to 100 parts by weight of a polyhydric alcohol or its alkylene oxide adduct is added to 100 parts by weight of a benzylic ether type phenolic resin, followed by heating under reduced pressure), may also be mentioned. They may be used alone or in a mixture of two or more.

The polyisocyanate compound used in the present invention is not particularly limited and may be one generally used for production of a polyurethane foam, examples of which include m- or p-phenylene diisocyanate, p-xylene diisocyanate, ethylene diisocyanate, tetramethylene-1,4-diisocyanate, hexamethylene-1,6-diisocyanate, diphenylmethane-4,4'-diisocyanate, 3,3-dichloro-4,4'-biphenylene diisocyanate or 1,5-naphthalene diisocyanate, 2,4- and 2,6-tolylene diisocyanate and their mixture, crude tolylene diisocyanate, 4,4'-diphenylmethane diisocyanate, and crude diphenylmethane diisocyanate. These isocyanate compounds may be used alone or in a mixture of two or more. Its amount used is an equivalent ratio of an isocyanate group to active hydrogen in a polyol component mixture solution containing water in a range of from 1.50 to 10.0, preferably from 1.70 to 4.50. If the above equivalent ratio is less than 1.50, flame retardancy, heat resistance and low smoking property become poor, and if it is more than 10.0, a foam produced becomes brittle and adhesion to a facing material becomes poor.

The morpholine compound used in the present invention has conventionally been used as a urethane-forming catalyst, however, it works as a compatibilizing agent in the process for producing a urethane-modified polyisocyanurate foam of the present invention. It may, for example, be morpholine, N-methylmorpholine or N-ethylmorpholine. They may be used alone or in a combination of two or more. Its amount used is preferably from 1 to 20 parts by weight, particularly preferably from 1.0 to 10 parts by weight, based on 100 parts by weight of the polyol component (B).

As the foam stabilizer used in the present invention, an organic polysiloxane copolymer generally used as a foam stabilizer in production of a urethane foam may be used as it is. Examples of the organic polysiloxane copolymer include SH-190, SH-192, SH-193, SH-194, M-505, M-507, M-509 and SRX253 manufactured by Toray Silicone K.K., L-520, L-540, L-580, L-582, L-5340, L-5410, L-5420, L-5470 and SZ-1127 manufactured by UNICAR CO., LTD., TFA-4200, TFA-4205 and TFA-7241 manufactured by Toshiba Silicone K.K., and B-8404 and B-8017 manufactured by GOLDSCHMIDT K.K. Further, as the foam stabilizer used in the present invention, a mixture of silicone type surfactants having different surface tensions as disclosed in Japanese Patent Application 2000-361130 may be mentioned. In this case, foams having a low density and a high density can be obtained.

The amount of the foam stabilizer used in the present invention is preferably from 0.5 to 5 parts by weight, particularly preferably from 1.0 to 3.0 parts by weight, based on 100 parts by weight of the polyol component (B).

The trimerization catalyst used in the present invention may be a trimerization catalyst for isocyanates used in production of e.g. a conventional polyisocyanurate resin. Examples of the trimerization catalyst include organic metal salt systems such as potassium acetate, potassium octenate and iron oxalate, and tertiary amine salts such as 2,4,6-tris(dimethylaminomethyl)-phenol and N,N',N"-tris(dimethylaminopropyl)hexahydrotriamine. In the present invention, an urethane-forming catalyst may be used together with the trimerization catalyst.

In the present invention, the trimerization catalyst, or the urethane-forming catalyst and the trimerization catalyst, are used in an amount of preferably from 0.35 to 15 parts by weight, particularly preferably from 0.70 to 10 parts by weight based on 100 parts by weight of the polyol component (B).

The urethane-forming catalyst used in the present invention, i.e. a catalyst used for carrying out urethane-foaming reaction may be one generally known as a urethane-forming catalyst, examples of which include N,N,N',N'-tetramethylethylenediamine, N,N,N',N'-tetramethylpropane-1,3-diamine, N,N,N',N'-tetramethylhexene-1,6-diamine, N,N,N',N",N"-pentamethyldiethylenetriamine, N,N-dicyclohexylmethylamine, bis(N,N-dimethylaminoethylpiperazyl)ethane, N,N',N"-tris(diethylaminopropyl)hexahydrotriazine and other tertiary amine, and dibutyltin dilaurate and dibutyltin diacetate. These catalysts may be used alone or in a mixture thereof.

Water used in the present invention reacts with a polyisocyanate compound to produce carbon dioxide gas and works as a blowing agent. The amount of water is determined depending on an aimed density of a foam, and is suitably from 2 to 30 parts by weight based on 100 parts by weight of the polyol component (B). If the amount of water is less than 2 parts by weight, the density of a foam becomes too high, and if it exceeds 30 parts by weight, the mechanical strength becomes too low for practical use. Particularly, the amount of water used is preferably from 2.5 to 15 parts by weight based on 100 parts by weight of the polyol component (B).

In the present invention, if necessary, a flame retardant or a crosslinking agent may be used. Examples of the flame retardant include triphenyl phosphate, tricresyl phosphate, trichloroethyl phosphate, triethyl phosphate and tris-β-chloroethyl phosphate, and they may be used alone or in a combination of two or more. Examples of the crosslinking agent include ethylene glycol, propylene glycol, 1,4-butanediol, 1,6-hexanediol, diethylene glycol, triethylene glycol, triethanolamine and ethylenediamine, and they may be used alone or in a combination. These additives and other additives may be previously mixed with a mixture containing the polyol component (B) or may be added thereto at the time of reacting.

Now, the present invention will be explained specifically with reference to Examples and Comparative Examples. "Part(s)" and "%" are based on weight. The density was measured in accordance with JIS A-9514 using a foam obtained by free-foaming. As an initial adhesion test, foaming in the form of a board was carried out by attaching a PE (polyethylene) coat kraft paper as a facing material to an aluminum made frame of 400×300×25 mm heated at 60° C., and after 1 and a half minutes had passed, the obtained foam was released from the frame, and a peeling test with a width of 10 cm was carried out after one minute and after 30 minutes to measure the adhesion.

EXAMPLE 1

20 parts of BEP (manufactured by Hodogaya Chemical Co., Ltd., modified phenolic resin OH value: 620), 50 parts of PL-180 (manufactured by Toho Rika K.K., aromatic polyester polyol OH value: 190), 10 parts of SOR400 (manufactured by Takeda Chemical Industries, Ltd., sorbitol type polyether polyol OH value: 395), 20 parts of SOR200 (manufactured by Takeda Chemical Industries, Ltd., sorbitol type polyether polyol OH value: 200), 10 parts of tris-(monomethyl-2-chloropropyl)phosphate (hereinafter referred to simply as TMCPP, manufactured by DAIHACHI CHEMICAL INDUSTRY CO., LTD., flame retardant), 15 parts of triethyl phosphate (hereinafter referred to simply as TEP, manufactured by Bayer Ltd., flame retardant), 5 parts of N-ethylmorpholine (hereinafter referred to simply as NEMO, manufactured by Wako Pure Chemical Industries, Ltd.), 1.9 parts of TSF-4452 (manufactured by Toshiba Silicone K.K., foam stabilizer), 0.15 part of TSF-451-50 (manufactured by Toshiba Silicone K.K., foam stabilizer), 6 parts of water, 5 parts of PELCAT9540 (manufactured by Pelron Co., trimerization catalyst) and 0.4 part of TOYO-CAT DT (manufactured by TOSOH CORPORATION, urethane-forming catalyst) were mixed, and 281 parts of MR-100 (manufactured by Nippon Polyurethane Industry Co., Ltd., crude diphenylmethane diisocyanate, NCO content: 31.0%) was added thereto, followed by stirring, and the mixture was transferred to a 1 l paper cup for foaming. The obtained foam was in a favorable foam state, and had a density of 26.5 kg/m$^3$.

As an initial adhesion test, the above mixture was subjected to foaming in the form of a board by attaching a PE coat kraft paper as a facing material to an aluminum made frame of 400×300×25 mm heated at 60° C., and after one and a half minutes had passed, the obtained foam was released from the frame, and a peeling test with a width of 10 cm was carried out after one minute and after 30 minutes, and results of at least 1.0 kg were obtained respectively.

EXAMPLES 2 to 7

Foaming was carried out in the same manner as in Example 1 except that the amount of NEMO used was changed, and the density was measured and the initial adhesion test was carried out. The measurement results are shown in Table 1.

Starting materials employed were as follows.

Polyol (1): 20 parts of BEP (manufactured by Hodogaya Chemical Co., Ltd., modified phenolic resin OH value: 620), 50 parts of PL-180 (manufactured by Toho Rika K.K., aromatic polyester polyol OH value: 190), 10 parts of SOR400 (manufactured by Takeda Chemical Industries, Ltd., sorbitol type polyether polyol OH value: 395), 20 parts of SOR200 (manufactured by Takeda Chemical Industries, Ltd., sorbitol type polyether polyol OH value: 200), TMCPP: tris-(monomethyl-2-chloropropyl)phosphate (manufactured by DAIHACHI CHEMICAL INDUSTRY CO., LTD., flame retardant)

TEP: triethyl phosphate (manufactured by Bayer Ltd., flame retardant)

NEMO: N-ethylmorpholine (manufactured by Wako Pure Chemical Industries, Ltd.)

TSF-4452: organic polysiloxane copolymer (manufactured by Toshiba Silicone K.K., foam stabilizer)

TSF-451-50: organic polysiloxane copolymer

PELCAT9540: trimerization catalyst (manufactured by Pelron Co.)

TOYOCAT DT: urethane-forming catalyst (manufactured by TOSOH CORPORATION)

DMF: dimethylformamide

DMAC: dimethyl acetamide

DMSO: dimethyl sulfoxide

MR-100: crude diphenyl methane diisocyanate (manufactured by Nippon Polyurethane Industry Co., Ltd.)

COMPARATIVE EXAMPLES 1 to 7

Foaming was carried out in the same manner as in Example 1 except that NEMO in the composition of Example 1 was changed to another compound, and the density was measured and the initial adhesion test was carried out. The results are shown in Table 2. An adhesion after one minute of at least 1 kg/10 cm was obtained, however, the adhesion after 30 minutes was so low as at most 0.5 kg/10 cm width in any Comparative Example, and it is found that a morpholine is excellent in view of the initial adhesion (after a relatively long period of time) as compared with another compatibilizing agent.

TABLE 1

| | Examples | | | | | | |
|---|---|---|---|---|---|---|---|
| | 1 | 2 | 3 | 4 | 5 | 6 | 7 |
| Polyol (1) | 100 | 100 | 100 | 100 | 100 | 100 | 100 |
| TMCPP | 10 | 10 | 10 | 10 | 10 | 10 | 10 |
| TEP | 15 | 15 | 15 | 15 | 15 | 15 | 15 |
| Water | 6 | 6 | 6 | 6 | 6 | 6 | 6 |
| TFS-4452 | 1.9 | 1.9 | 1.9 | 1.9 | 1.9 | 1.9 | 1.9 |
| TSF-451-50 | 0.15 | 0.15 | 0.15 | 0.15 | 0.15 | 0.15 | 0.15 |
| PELCAT9540 | 5 | 5 | 5 | 5 | 5 | 5 | 5 |
| TOYOCAT-DT | 0.4 | 0.4 | 0.4 | 0.4 | 0.4 | 0.4 | 0.4 |
| NEMO | 5 | 3 | 2 | 1 | 3 | 2 | 1 |
| DMF | 0 | 5 | 5 | 5 | 0 | 0 | 0 |
| MR-100 | 281 | 281 | 281 | 281 | 281 | 281 | 281 |
| NCO/OH equivalent ratio | 1.75 | 1.75 | 1.75 | 1.75 | 1.75 | 1.75 | 1.75 |
| Density (kg/m$^3$) | 26.5 | 26 | 27.1 | 26.3 | 26.5 | 26.4 | 26.7 |
| Adhesion (kg/10 cm) | | | | | | | |
| 1 min. after | 1< | 1< | 1< | 1< | 1< | 1< | 1< |
| 30 min. after | 1< | 1< | 1< | 1< | 1< | 1< | 1< |

TABLE 2

|  | Comparative Examples | | | | | | |
|---|---|---|---|---|---|---|---|
|  | 1 | 2 | 3 | 4 | 5 | 6 | 7 |
| Polyol (1) | 100 | 100 | 100 | 100 | 100 | 100 | 100 |
| TMCPP | 10 | 10 | 10 | 10 | 10 | 10 | 10 |
| TEP | 15 | 15 | 15 | 15 | 15 | 15 | 15 |
| Water | 6 | 6 | 6 | 6 | 6 | 6 | 6 |
| TFS-4452 | 1.9 | 1.9 | 1.9 | 1.9 | 1.9 | 1.9 | 1.9 |
| TSF-451-50 | 0.15 | 0.15 | 0.15 | 0.15 | 0.15 | 0.15 | 0.15 |
| PELCAT9540 | 5 | 5 | 5 | 5 | 5 | 5 | 5 |
| TOYOCAT-DT | 0.4 | 0.4 | 0.4 | 0.4 | 0.4 | 0.4 | 0.4 |
| NEMO | 0 | 0 | 0 | 0 | 0 | 0 | 0 |
| DMF | 5 | 0 | 0 | 0 | 0 | 0 | 0 |
| TEP | 0 | 5 | 0 | 0 | 0 | 0 | 0 |
| DMAC | 0 | 0 | 5 | 0 | 0 | 0 | 0 |
| Butyl acetate | 0 | 0 | 0 | 5 | 0 | 0 | 0 |
| N-methyl pyrrolidone | 0 | 0 | 0 | 0 | 5 | 0 | 0 |
| Acetonitrile | 0 | 0 | 0 | 0 | 0 | 5 | 0 |
| DMSO | 0 | 0 | 0 | 0 | 0 | 0 | 5 |
| MR-100 | 281 | 281 | 281 | 281 | 281 | 281 | 281 |
| NCO/OH equivalent ratio | 1.75 | 1.75 | 1.75 | 1.75 | 1.75 | 1.75 | 1.75 |
| Density (kg/m$^3$) | 26 | 27.2 | 26.8 | 26.4 | 26.3 | 26.7 | 26.4 |
| Adhesion (kg/10 cm) | | | | | | | |
| 1 min. after | 1< | 1< | 1< | 1< | 1 | 1 | 1< |
| 30 min. after | 0.4 | 0.2 | 0.5 | 0.2 | 0.2 | 0.1 | 0.1 |

INDUSTRIAL APPLICABILITY

According to the present invention, a process for producing a urethane-modified polyisocyanurate foam having excellent characteristics such as flame retardancy, heat resistance and low smoking property, and further having improved initial adhesion, particularly adhesion after a relatively long period of time, to a facing material particularly a flexible facing material, by using water as a blowing agent without use of CFCs or HCFCs, can be provided.

What is claimed is:

1. A process for producing a urethane-modified polyisocyanurate foam, which comprises reacting a polyisocyanate compound component (A), a polyol component (B), water (C), a foam stabilizer (D) and a morpholine compound (E), in the presence of a trimerization catalyst (F),
    wherein the above morpholine compound (E) is one or two or more members selected from the group consisting of morpholine, N-methylmorpholine and N-ethylmorpholine, and
    wherein the polyol component (B) contains a benzylic ether phenolic resin and/or a modified phenolic resin obtained by reacting a polyhydric alcohol or its alkylene oxide adduct with a benzylic ether phenolic resin.

2. The process for producing a urethane-modified polyisocyanurate foam according to claim 1, wherein the above morpholine compound (E) is used in an amount of from 1 to 20 parts by weight based on 100 parts by weight of the polyol component (B).

3. The process for producing a urethane-modified polyisocyanurate foam according to claim 1, wherein the above trimerization catalyst (F) is used in an amount of from 0.35 to 15 parts by weight based on 100 parts by weight of the polyol component (B).

4. The process for producing a urethane-modified polyisocyanurate foam according to claim 1, wherein the above water (C) is used in an amount of from 2 to 30 parts by weight based on 100 parts by weight of the polyol component (B).

5. The process for producing a urethane-modified polyisocyanurate foam according to claim 1, wherein the above foam stabilizer (D) is used in an amount of from 0.5 to 5 parts by weight based on 100 parts by weight of the polyol component (B).

6. The process for producing a urethane-modified polyisocyanurate foam according to claim 1, wherein the above foam stabilizer (D) is an organic polysiloxane copolymer.

7. The process for producing a urethane-modified polyisocyanurate foam according to claim 1, wherein the above trimerization catalyst (F) is a trimerization catalyst for isocyanates, comprising an organic metal salt or a tertiary amine salt.

8. The process for producing a urethane-modified polyisocyanurate foam according to claim 1, wherein the above trimerization catalyst (F) is used together with a urethane-forming catalyst.

9. A urethane-modified polyisocyanurate foam prepared by the process of claim 1.

* * * * *